United States Patent
Langenhuizen et al.

(10) Patent No.: US 6,700,848 B1
(45) Date of Patent: Mar. 2, 2004

(54) APPARATUS FOR DRIVING A RECORD CARRIER

(75) Inventors: Theodorus A. E. Langenhuizen, Eindhoven (NL); Antonius H. M. Akkermans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/546,972

(22) Filed: Apr. 11, 2000

(65) Prior Publication Data (65)

(30) Foreign Application Priority Data

Apr. 14, 1999 (EP) .............................. 99201170

(51) Int. Cl.⁷ ................................. G11B 5/76
(52) U.S. Cl. ............... 369/59.17; 369/59.21; 369/53.19
(58) Field of Search ............ 369/44.32, 44.34, 369/53.19, 43, 59, 44.29, 53.31, 59.1, 59.17, 59.21

(56) References Cited

U.S. PATENT DOCUMENTS

| | | | | |
|---|---|---|---|---|
| 4,607,358 A | * | 8/1986 | Maeda et al. | 369/44.28 |
| 5,402,401 A | * | 3/1995 | Akkermans | 369/44.28 |
| 5,412,692 A | * | 5/1995 | Uchida | 375/317 |
| 5,841,751 A | * | 11/1998 | Komazaki et al. | 369/53.33 |
| 6,075,760 A | * | 6/2000 | Tsutsui et al. | 369/44.27 |
| 6,088,308 A | * | 7/2000 | Jacobowitz et al. | 369/44.28 |
| 6,333,909 B1 | * | 12/2001 | Zaima | 369/116 |
| 6,430,130 B1 | * | 8/2002 | Furukawa | 369/53.19 |

FOREIGN PATENT DOCUMENTS

EP 0814462 A2 12/1997 ............ G11B/7/00

* cited by examiner

*Primary Examiner*—Paul W. Huber
(74) *Attorney, Agent, or Firm*—Michawl E. Belk

(57) ABSTRACT

An apparatus for driving a record carrier according to the invention comprises a transducer for generating a read signal in response to patterns recorded at the record carrier and displacement means for displacing the transducer and the record carrier with respect to each other. Out of the read signal an auxiliary signal having a relatively low frequency content is generated. The apparatus comprises binary signal generating means for generating a binary signal out of the auxiliary signal including first hold means for generating a first hold signal, second hold means for generating a second hold signal, signal combination means for generating a slicing signal out of the first hold signal and the second hold signal, and comparing means for comparing the auxiliary signal with the slicing signal and outputting a binary output signal. The first hold means are adapted for temporarily maintaining the first hold signal at a value substantially corresponding to a top value of the auxiliary signal. The first hold means are further adapted for temporarily maintaining the value of the first hold signal at a value substantially corresponding to a bottom value of the auxiliary signal augmented by an addition value. The second hold means are adapted for temporarily maintaining the second hold signal substantially at a value corresponding to a bottom value of the auxiliary signal. The second hold means are further adapted for temporarily maintaining the value of the second hold signal at a value corresponding to a top value of the auxiliary signal diminished by a subtraction value.

8 Claims, 5 Drawing Sheets

APPARATUS FOR DRIVING A RECORD CARRIER

Figure 1:
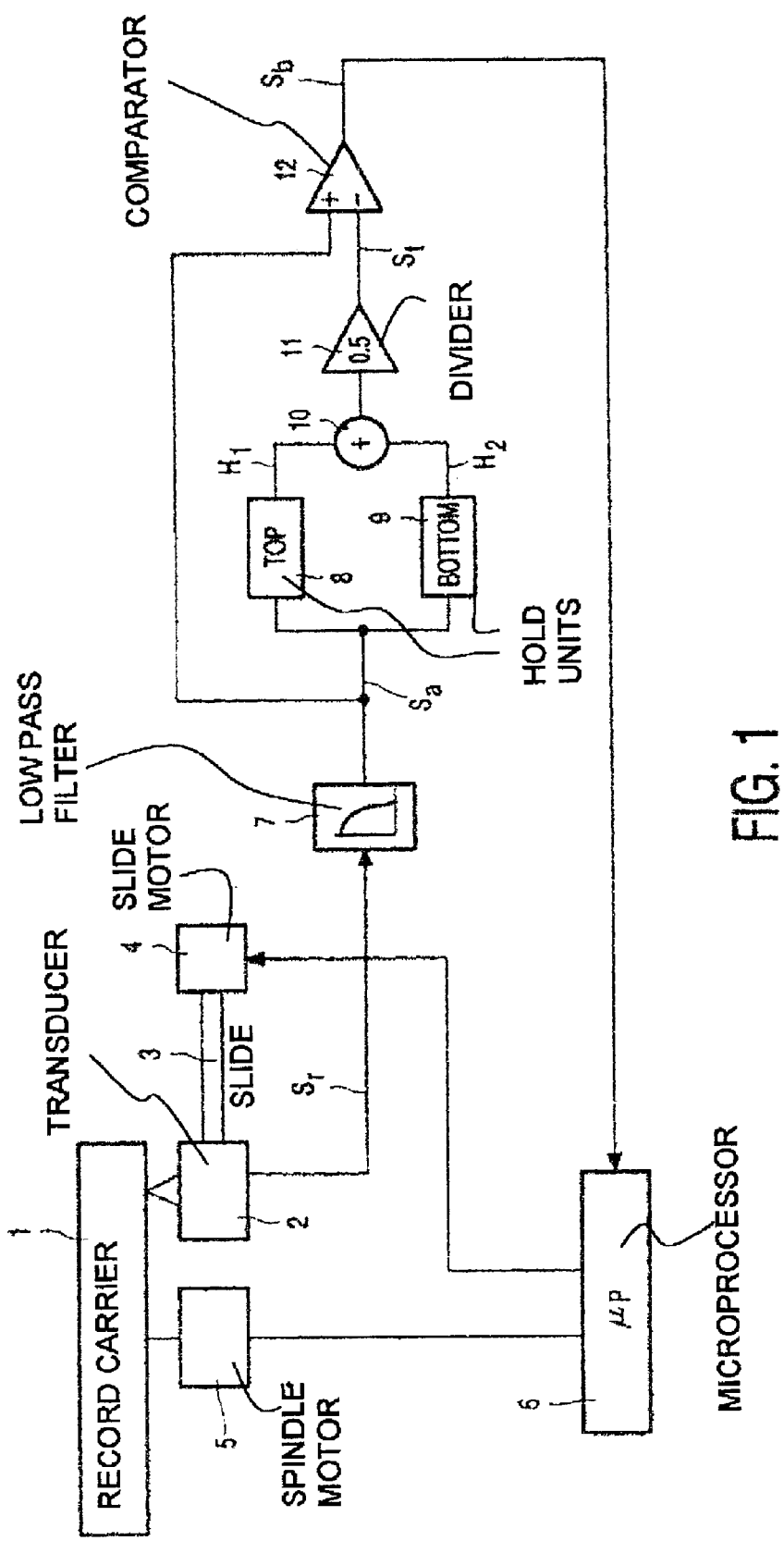

The invention relates to an apparatus for driving a record carrier, which apparatus comprises a transducer for generating a read signal in response to patterns recorded at the record carrier and displacement means for displacing the transducer and the record carrier with respect to each other, which apparatus comprises auxiliary signal generating means for deriving an auxiliary signal from the read signal, which auxiliary signal has a relatively low frequency content as compared to the read signal, binary signal generating means for generating a binary signal out of the auxiliary signal including first hold means for generating a first hold signal, second hold means for generating a second hold signal, signal combination means for generating a slicing signal out of the first hold signal and the second hold signal, and comparing means for comparing the auxiliary signal with the slicing signal and outputting a binary output signal, which first hold means are adapted for temporarily maintaining the first hold signal at a value substantially corresponding to a top value of the auxiliary signal, which second hold means are adapted for temporarily maintaining the second hold signal substantially at a value corresponding to a bottom value of the auxiliary signal.

An apparatus as disclosed in the opening paragraph is known from European Patent Application EP 814 462. The read signal comprises relatively high-frequency components which represent information stored at the record carrier and comprises relatively low-frequency components which are used for control of the displacement means. The amplitude of the read signal may vary due to several causes, such as fingerprints on the disk. As a result the auxiliary signal varies around a center value which itself is variable. In the known apparatus the signal combination means, formed by an adder and a multiplier, receive a first hold signal from a top hold detector and a second hold signal from a bottom hold detector. The value of the first hold signal gradually diminishes during intervals where said output value is higher than the auxiliary signal at the input of the top hold detector. The combination of top hold detector, bottom hold detector and output means enables the apparatus to adapt the slicing level to relatively slow changes in the center value, so that despite such slow changes a reliable binary output signal is obtained. In addition the apparatus has a defect signal detecting unit for holding at least one of the top hold detector and the bottom hold detector if no reliable auxiliary signal is available. It is a disadvantage of the known apparatus that the binary signal generating means cannot follow fast changes in the center value of the auxiliary signal.

It is a purpose of the invention to provide an apparatus according to the introductory paragraph in which this disadvantage is avoided. For this purpose the apparatus according to the invention is characterized in that the first hold means are further adapted for temporarily maintaining the value of the first hold signal at a value substantially corresponding to a bottom value of the auxiliary signal augmented by an addition value and in that the second hold means are further adapted for temporarily maintaining the value of the second hold signal at a value corresponding to a top value of the auxiliary signal diminished by a subtraction value.

In the circumstances that the auxiliary signal varies around a constant center value or a slowly variating center level, the value of the first hold signal remains less than the auxiliary signal augmented by an addition value. Likewise the value of the second hold signal remains higher than the value of the auxiliary signal diminished by a subtraction value. Hence in those circumstances the slicing level is based on the top hold value and the bottom hold value of the auxiliary signal. If however the value of the auxiliary signal augmented with the addition value (augmented value) decreases until a value lower than the present top value, then the output of the first hold means is determined by the augmented value. Likewise if the value of the auxiliary signal diminished with the subtraction value (diminished value) increases until a value higher than the present bottom value then the output of the second hold means is determined by the diminished value. This allows the binary signal generation means to rapidly adapt to variations in properties of the auxiliary signal.

It is remarked that U.S. Pat. No. 5,412,692 discloses a data which has binary signal generating means comprising a maximum value detector, a minimum value detector, a voltage shift-down circuit and a voltage shift up circuit. The slicing level is determined by the average value of the signals generated by the voltage shift-down circuit and the voltage shift-up circuit. This average value generally has an error which is proportional to the difference between the values generated by the shift-up circuit and that by the shift-down circuit. The influence of said error on the accuracy of the binary output signal increases however during intervals wherein the first auxiliary signal has a small amplitude. In the apparatus of the invention the slicing signal is computed from the top hold value and the bottom hold value in those circumstances. Hence the difference between the top value and the bottom value, and therewith the error in the slicing signal is also small.

Figure 2A:
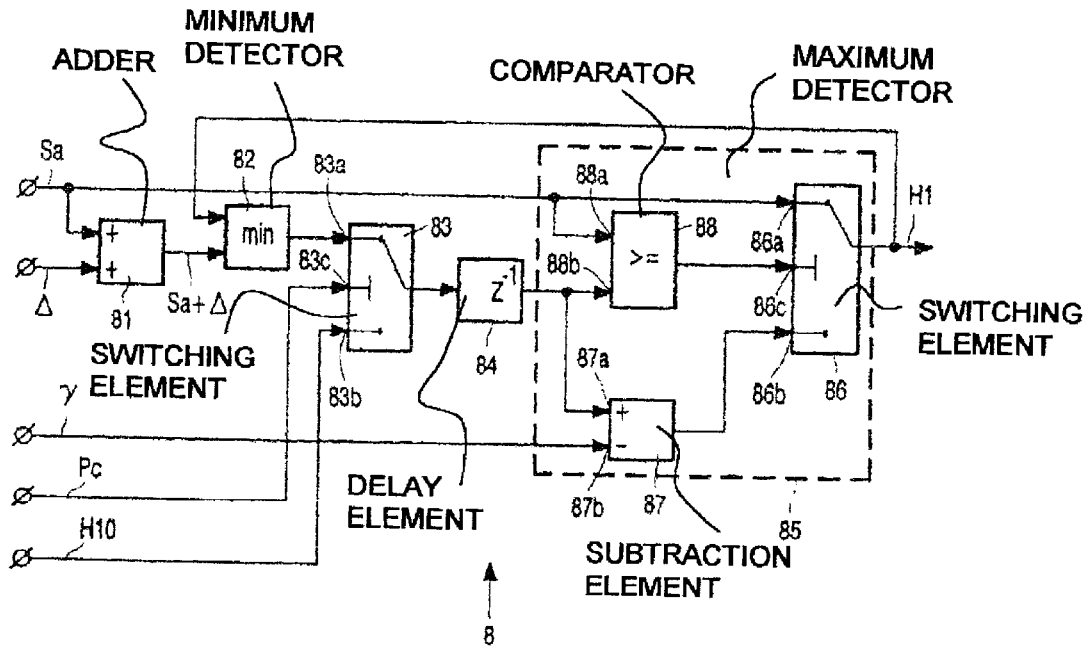
Figure 2B:
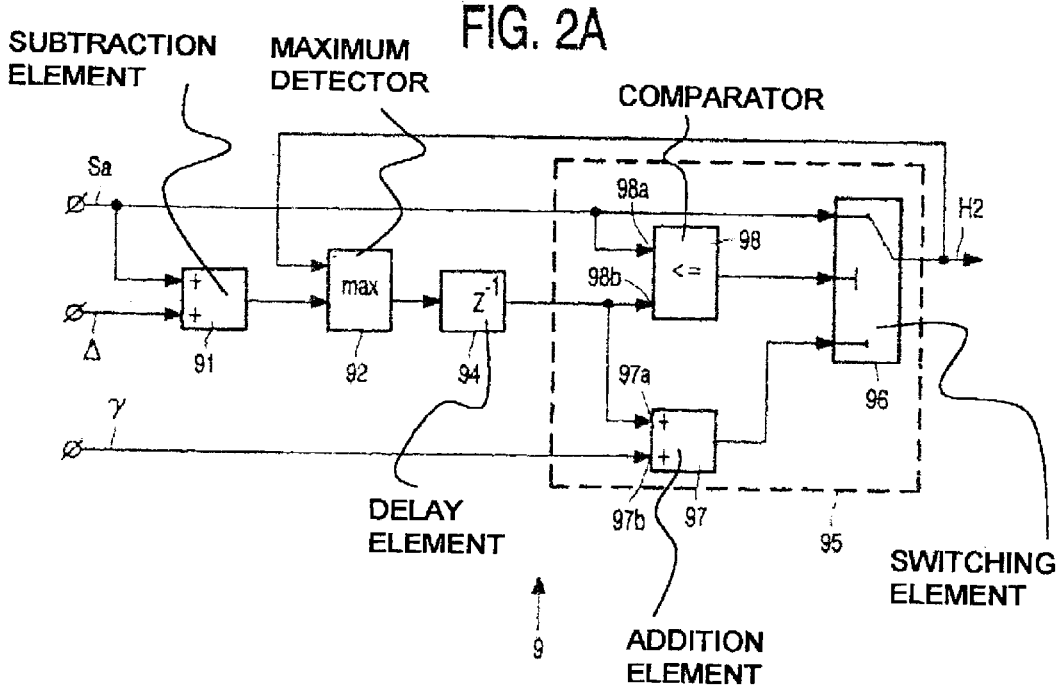
Figure 3:
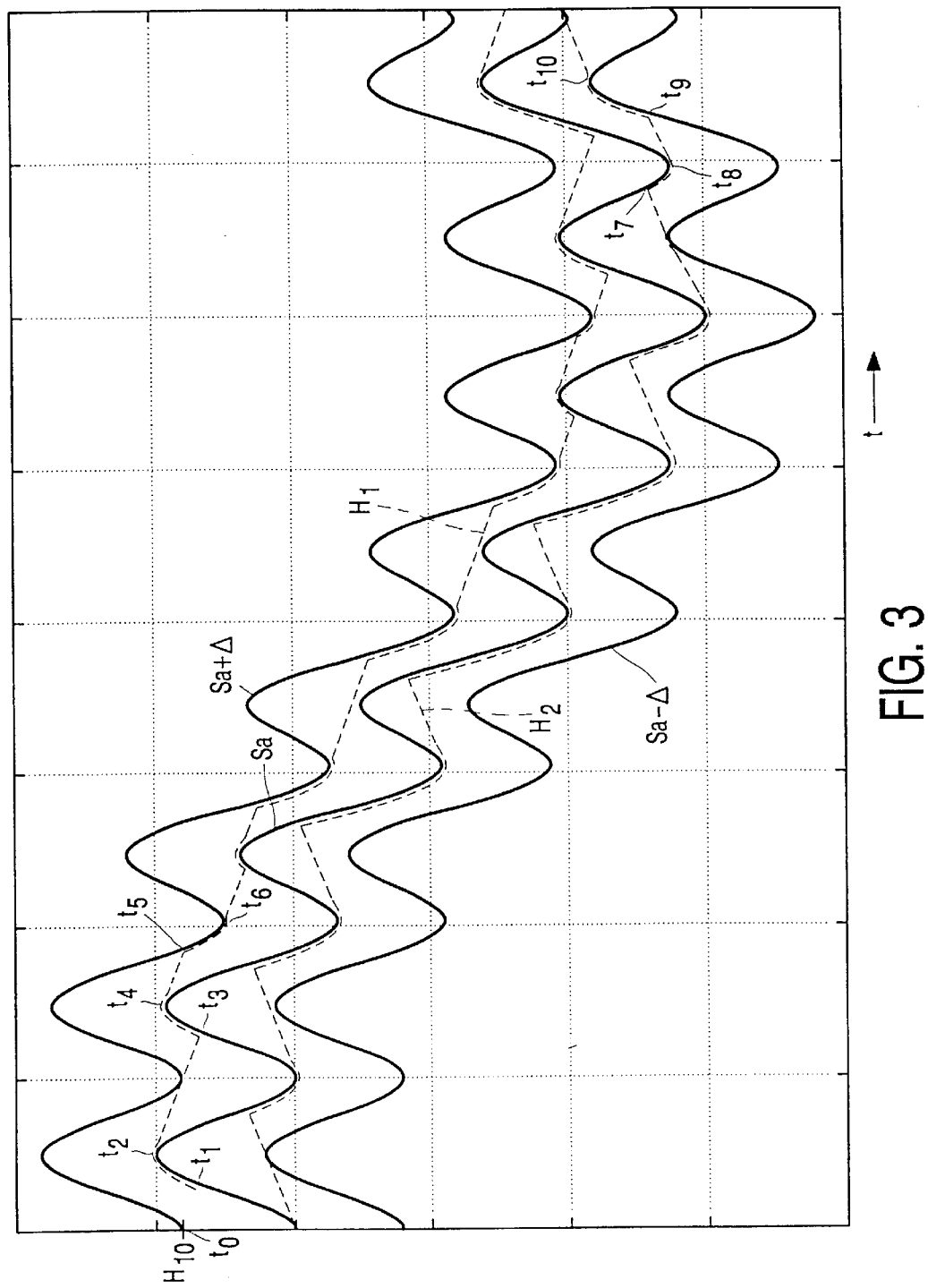
Figure 4:
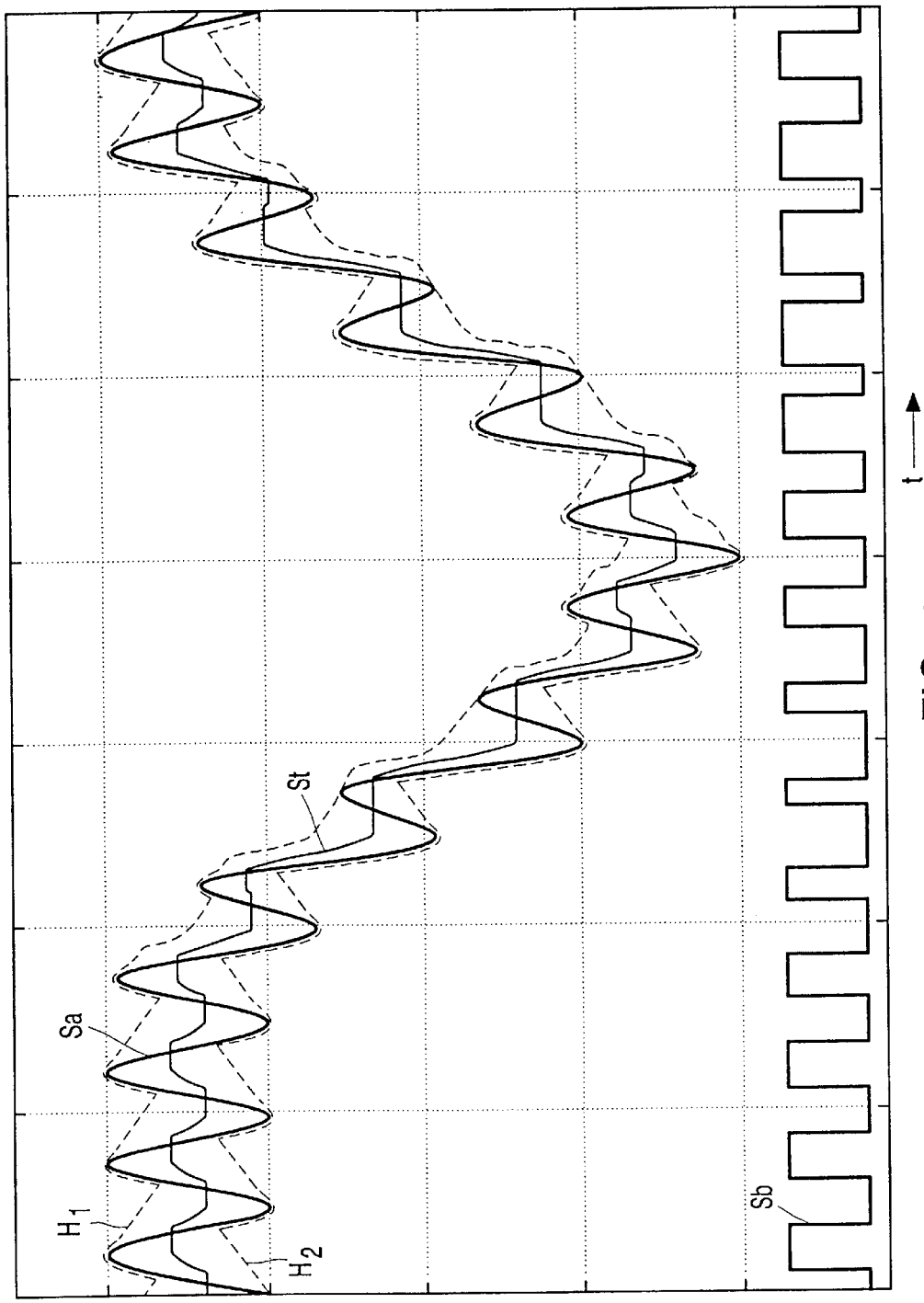

These and other aspects of the apparatus of the invention are described in more detail with reference to a drawing. Therein FIG. 1 shows an embodiment of the apparatus according to the invention, FIGS. 2A and 2B show in more detail parts of the binary signal generating means of the apparatus of FIG. 1, FIGS. 3 and 4 show signals occurring in the apparatus of FIGS. 1, 2A and 2B, FIGS. 5A and 5B show parts of the binary signal generating means in another embodiment of the apparatus according to the invention.

FIG. 1 shows an apparatus for driving a record carrier 1. The apparatus comprises a transducer 2 for generating a read signal Sr in response to patterns recorded at the record carrier. In the embodiment shown the record carrier 1 is formed by an optical disc, however it may have another type of recording medium, e.g. magnetic, or be in another form e.g. in the form of a tape or a card. The transducer 2 may be displaced with respect to the optical disc by means of a slide 3, which is driven by a slide motor 4. Furthermore, the record carrier is rotated by a spindle motor 5. Both the slide motor 4 and the spindle motor 5 are controlled by a micro-processor 6.

The apparatus comprises auxiliary signal generating means 7 formed by a low-pass filter for deriving an auxiliary signal Sa from the read signal Sr. The auxiliary signal Sa has a relatively low frequency content as compared to the read signal Sr. In the present embodiment the signal Sa is the low-pass filtered central aperture signal, but the signal Sa may be another low-frequency signal, such as a focus error signal.

The auxiliary signal Sa is received by first hold means 8 for generating a first hold signal H1 and by second hold means 9 for generating a second hold signal H2 out of the auxiliary signal Sa. The first hold signal H1 and the second hold signal H are added by adder 10. Divider 11 divides the output signal by 2 so as to generate a slicing signal St. The adder 10 and divider 11 form signal combination means.

The first hold means 8 are adapted for temporarily maintaining the first hold signal H1 at a value substantially corresponding to a top value of the auxiliary signal Sa.

The second hold means 9 are adapted for temporarily maintaining the second hold signal H2 at a value substantially corresponding to a bottom value of the auxiliary signal Sa.

The apparatus further has comparing means 12 for comparing the auxiliary signal Sa with the slicing signal St and outputting a binary signal Sb.

The first hold means 8, the second hold means 9, the signal combination means 10, 11 and the comparing means 12 together form binary signal generating means for generating a binary signal Sb out of the auxiliary signal Sa.

The first hold means 8 are further adapted for temporarily maintaining the value of the first hold signal H1 at a value substantially corresponding to a bottom value of the auxiliary signal augmented by an addition value. The second hold means 9 are further adapted for temporarily maintaining the value of the second hold signal at a value corresponding to a top value of the auxiliary signal diminished by a subtraction value.

The first hold means 8 in a first embodiment of the apparatus of the invention are shown in more detail in FIG. 2A. The first hold means 8 comprise an adder 81 for augmenting the auxiliary signal Sa with addition value $\Delta$. A minimum detector 82 generates a signal corresponding to the minimum of the signal so obtained and an intermediate signal, i.c. the first hold signal H1. The output of the minimum detector 82 is coupled to a first input 83$a$ of a switching element 83. A second input 83$b$ of the switching element 83 is coupled to a preset signal source (not shown) generating a signal H10. A control input 83$c$ of the switch 83 is coupled to the microprocessor 6. Via the switching element 83 the preset value H10 may be loaded in a delay element 84. The preset value H10 is equal to the value of the auxiliary signal Sa, here the low pass filtered central aperture signal, during track following mode of the apparatus augmented with the addition value $\Delta$.

The first hold means 8 shown further comprise a maximum detector 85 for generating a signal H1 substantially corresponding to the maximum of the auxiliary signal Sa and an intermediate signal. The intermediate signal is received from the delay element 84. The maximum detector 85 comprises a switching element 86 having a first input 86$a$ for receiving the auxiliary signal Sa. A second input 86$b$ is coupled via an input 87$a$ of a subtraction element 87 to the delay element. A further input 87$b$ of the subtraction element 87 receives a decay signal $\gamma$. The switching element 86 is controlled by the output signal of comparator 88. The comparator has a first input 88$a$ for receiving the auxiliary signal Sa and a second input 88$b$ for receiving the output signal of the delay element 84. The comparator 88 generates an output signal 86$c$ indicating whether the value of the auxiliary signal Sa is higher than the value of the intermediate signal received from the delay element 84.

The first hold means operate as follows. By means of a preset control signal Pc the switching element 83 is brought in a preset mode in which it accepts the preset value H10 at its second input 83$b$. This value H10 is loaded in the delay element 84. After the delay element 84 has received the preset value H10, the polarity of the preset control signal Pc is reversed so as to bring the switching element 83 in a normal operation mode, as shown in the drawing, in which it accepts input from the minimum detector 82. The output of the delay element 84 is compared with the auxiliary signal Sa. If the value of the auxiliary signal Sa is higher than that of the output of the delay element 84 or equal thereto, the switching element 86 assumes a first state in which it selects the auxiliary input signal Sa from its first input 86$a$. If the value of the auxiliary signal Sa is lower than that of the output of the delay element 84, the switching element assumes a second state, wherein it selects the output of the subtraction element 87. The value at the output of the minimum detector 82 is either the value of the first hold signal H1 or the value of the auxiliary signal augmented by the addition value Sa+$\Delta$, whichever is lower.

In a track following mode of the apparatus, the central aperture signal Sa has a constant value which substantially corresponds to the bottom value in the track jumping mode. The second hold signal H2 therefore can be reliably based on the signal Sa. However the top value of the signal Sa can only be measured during the track jumping mode. This would have the disadvantage that the slicing level St and therewith the binary signal Sb is unreliable when the track jumping mode is entered, which may result in erroneous track counting. In the embodiment shown the first hold signal is initialized with the value H10, being equal to the value of the signal Sa measured during track following mode augmented with the addition value $\Delta$. The value H10 is an estimation of the top value of the auxiliary signal Sa. This enables the apparatus to generate a reliable binary signal Sb immediately after entering track jumping mode.

The second hold means, shown in FIG. 2B are analogue to the first hold means but differs in the following respects. Instead of addition element 81, minimum detector 82, and subtraction element 87 the second hold means 9 comprise a subtraction element 91, a maximum detector 92 and addition element 97. Instead of the comparator 88 as shown in FIG. 2, the second hold means 9 comprise a comparator 98 which determines whether the value of the auxiliary signal is less than that of the delay element. Other elements in FIG. 2B are equivalent to elements in FIG. 2A having a reference number which is 10 lower.

The operation of the apparatus shown in FIGS. 1, 2A and 2B is illustrated with reference to FIGS. 3 and 4. FIG. 3 indicates the auxiliary signal Sa, the auxiliary signal augmented by the addition value Sa+$\Delta$ and the auxiliary signal diminished by the subtraction value Sa−$\Delta$ by solid lines. FIG. 3 further indicates the first hold signal H1 and the second hold signal H2 by broken lines. At time to the value of the first hold signal is preset by loading the value H10 via switching element 83 into the delay element 84. In the time interval from to until t1 the value of the auxiliary signal Sa is less than the value of the signal output by the delay element 84. In this time interval the switching element 86 selects the signal at its second input 86$b$. This has the effect that the first hold signal H1 is equal to the output of the delay element 84 reduced by decay value $\gamma$. In this time interval the value of the first hold signal H1 is less than the value of the signal Sa+$\Delta$. Hence the output signal of the minimum detector 82 delivered via the switching element 83 to the delay element 84 equals the value of the first hold signal H1. As a consequence the value of the first hold signal H1 is step-wise reduced in the time interval from t0 to t1. In the time interval from t1 to t2 the value of the output signal of the delay element 84 is lower than the value of the auxiliary signal Sa. The switching element 86 now selects the auxiliary signal Sa offered at its first input 86$a$ so that the first hold signal H1 is equal to the auxiliary signal Sa. In the time interval t1–t2 the value of the first hold signal H1 is still lower than the value of the auxiliary signal augmented by the addition value Sa+Δ. Hence the value of the first hold signal H1 is loaded via the minimum detector 82 and the switching element 83 in the delay element 84. After time t2 the first hold means 8 temporarily maintain the value of the first hold signal at a value substantially corresponding to a top value of the auxiliary signal Sa detected at t2. Substantially corresponding is defined here as differing not more than 10% of the peak to peak value of the auxiliary signal. The duration of which the value of H1 substantially corresponds to said top value depends on the decay factor γ and the speed with which the a new value of the first hold signal is computed. During the time interval t4–t5 the operation of the first hold means 8 is identical to the operation in the time interval t2–t3. In the time interval t3–t4 the operation is identical to the operation t1–t2. In the time interval from t5 to t6 the value of the auxiliary signal Sa+Δ augmented by the addition value is less than the value of the first hold signal H1. The output of the minimum detector 82 is now equal to the value of the signal Sa+Δ, so that this value is loaded into the delay element 84 via the switching element 83. The comparator 88 now detects that the value of the output signal of the delay element 84 is higher than the value of the auxiliary signal Sa, so that the switching element 86 selects the output signal of the subtraction means 87 at its second input 86b as the first hold signal H1. This has the effect that the first hold signal substantially follows the signal Sa+Δ in the time interval t5–t6. Subsequently the first hold means 8 temporarily maintain the first hold signal H1 at a value corresponding to a bottom value of the signal Sa+Δ.

In the time interval from t7 until t8 the value of the auxiliary signal Sa is less than the value at the output of delay element 94. Consequently the switching element 96 selects the auxiliary signal Sa as the second hold signal H2. This value now is higher than the value of the auxiliary signal diminished by the subtraction value Sa−Δ, so that the value of the second hold signal H2 is loaded via the maximum detector 92 in the delay element 94. In the succeeding time interval t8–t9 the value of the auxiliary signal is higher than the output value of the delay element, so that the switching element selects the output signal of the addition element as the second hold signal. The value of the second hold signal still is higher than the value of the signal Sa−Δ, so that the delay element receives the second hold signal. In this time interval the second hold means 9 temporarily maintain the second hold signal H2 substantially at a value corresponding to the bottom value of the auxiliary signal Sa detected at t8.

In the time interval t9–t10 the value of Sa−Δ is higher than the value of the second hold signal H2, so that the delay element 94 receives the former signal Sa−Δ via the maximum detector 92. The value of the output signal of the delay element 94 is less than the value of the auxiliary signal Sa. Hence the switching element 96 selects the output signal of the addition element as the second hold signal H2. The second hold signal H2 now substantially follows the signal Sa−Δ until t10. At t10 the auxiliary signal diminished by the subtraction value Sa−Δ attains a top value. After t10 the second hold means temporarily maintain the value of the second hold signal H2 at a value substantially corresponding to a top value of Sa−Δ.

FIG. 4 again shows the auxiliary signal Sa and the first and the second hold signal H1, H2. In addition FIG. 4 shows the slicing signal St and the binary signal Sb. From FIG. 4 it is clear that in the apparatus according to the invention the slicing signal St is adapted to the auxiliary signal so that a reliable binary signal Sb is obtained despite variations in the average value of the auxiliary signal.

In the above embodiment the addition value is equal to the subtraction value. Both values are equal to a fraction of the normal amplitude of the auxiliary signal, i.e. between 0.6 and 1.0 of the amplitude. In this case the values equal a fraction 0.75 of the normal amplitude. In the above embodiment both the first hold means 8 and the second hold means 9 comprise decay means 87, 97 respectively. The decay means allow the binary signal generating means not only to adapt to a changing center value but also to a changing amplitude of the auxiliary signal.

Figure 5A:
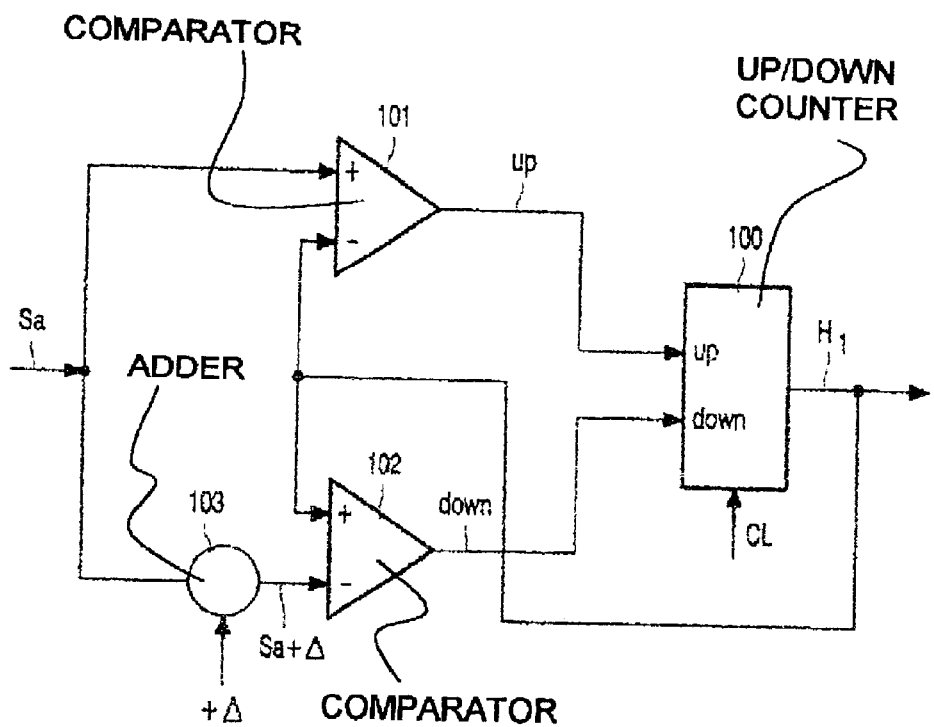

FIG. 5A shows the first hold means in a second embodiment of the apparatus according to the invention. In this embodiment the first hold signal H1 is generated by an up/down counter 100. A signal UP for counting up is generated by a first comparator 101 which compares the value of the first hold signal H1 with the value of the auxiliary signal Sa. A signal DOWN for counting down is generated by a second comparator 102 which compares the value of the first hold signal H1 with the value of the signal Sa+Δ generated by adder 103. In the time interval t3–t4 indicated in FIG. 3, the value of the signal Sa is higher than the value of the first hold signal H1. The signal UP attains logical value TRUE. Consequently the counter 100 increases the value of the first hold signal H1 so that it follows the auxiliary signal Sa. At time t4 the auxiliary signal Sa attains a top value. In the time interval from t4 until t5 the value of the first hold signal Sa is higher than that of the auxiliary signal, but less than that of the auxiliary signal augmented with the addition value Sa+Δ In this time interval neither the UP nor the DOWN signal is active, so that the value of the first hold signal is maintained at the detected top value of the auxiliary signal. In the interval t5–t6 the value of the signal Sa+Δ is lower than the value of the first bold signal H1. Now the DOWN signal is true, so that the output value of the counter 100 follows the signal Sa+Δ. At t6 the signal Sa+Δ has attained a bottom value. In the interval immediately following t6 again neither the UP nor the DOWN signal is active, so that the value of the first hold signal H1 is maintained at the bottom value of the signal Sa+Δ.

Figure 5B:
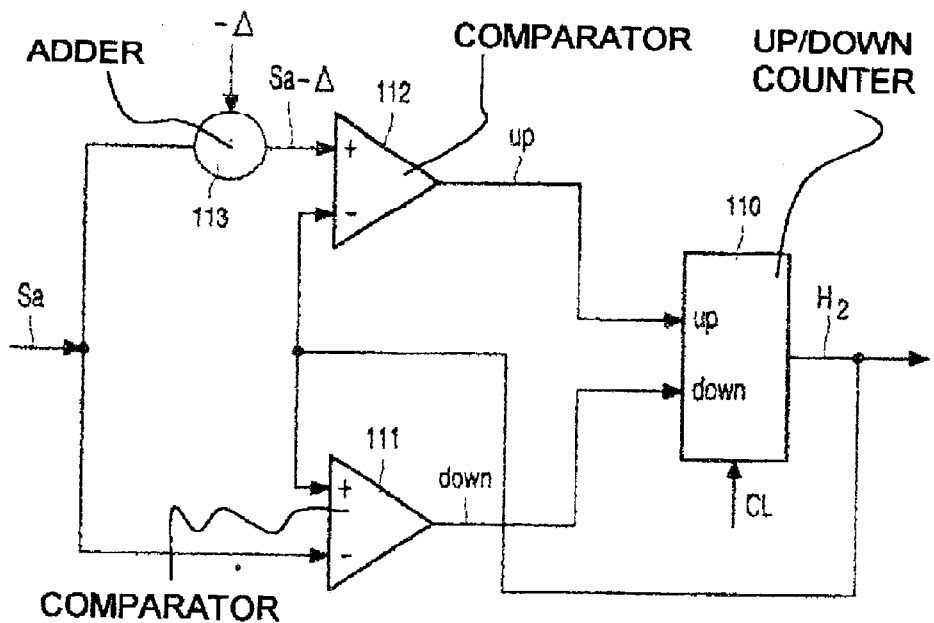

FIG. 5B shows second hold means (110–113) in the other embodiment. The operation of the second hold means shown is analogous to that of the first hold means shown in FIG. 5A.

It is remarked that the scope of protection of the invention is not restricted to the embodiments described herein. Neither is the scope of protection restricted by the reference numerals included in the claims. The word 'comprising' does not exclude other parts than those mentioned in a claim. The word 'a(n)' preceding an element does not exclude a plurality of those elements.

What is claimed is:

1. Apparatus for driving a record carrier (1), which apparatus comprises a transducer (2) for generating a read signal (Sr) in response to patterns recorded at the record carrier and displacement means (3,4,5) for displacing the transducer (2) and the record carrier (1) with respect to each other, which apparatus comprises auxiliary signal generating means (7) for deriving an auxiliary signal (Sa) from the read signal (Sr), which auxiliary signal has a relatively low frequency content as compared to the read signal, the apparatus further comprising binary signal generating means (8,9,10,11,12) for generating a binary signal (Sb) out of the auxiliary signal (Sa) including first hold means (8) for generating a first hold signal (H1), second hold means (9) for generating a second hold signal (H2), signal combination means (10,11) for generating a slicing signal (St) out of the first hold signal (H1) and the second hold signal (H2), and comparing means (12) for comparing the auxiliary signal (Sa) with the slicing signal (St) and outputting a binary output signal (Sb), which first hold means (8) are adapted for temporarily maintaining the first hold signal (H1) at a value substantially corresponding to a top value of the auxiliary signal (Sa), which second hold means (9) are adapted for temporarily maintaining the second hold signal (H2) substantially at a value corresponding to a bottom value of the auxiliary signal (Sa), characterized in that, the first hold means (8) are further adapted for temporarily maintaining the value of the first hold signal (H1) at a value substantially corresponding to a bottom value of the auxiliary signal augmented by an addition value (Sa+Δ), and in that the second hold means (9) are further adapted for temporarily maintaining the value of the second hold signal (H2) at a value corresponding to a top value of the auxiliary signal diminished by a subtraction value (Sa−Δ).

2. Apparatus according to claim 1, characterized in that, the first hold means (8) comprise a maximum detector (85) for generating a signal (H1) at least substantially corresponding to the maximum of the auxiliary signal (Sa) and an intermediate signal, and a minimum detector (82) for generating a signal corresponding to the minimum of the auxiliary signal augmented by the addition value (Sa+Δ) and an intermediate signal.

3. Apparatus according to claim 1, characterized in that, the second hold means (9) comprises a minimum detector (95) for generating a signal (H2) corresponding to the minimum of the auxiliary signal (Sa) and an intermediate signal, and a maximum detector (92) for generating a signal corresponding to the maximum of the auxiliary signal diminished by the subtraction value (Sa−Δ) and an intermediate signal.

4. Apparatus according to claim 1, characterized in that, the first hold means comprises counter means (100) for generating the first hold signal (H1), first comparator means (101) for generating a first control signal (UP) to the counter means which indicates whether the value of the auxiliary signal (Sa) is higher than the value of the first hold signal (H1), and second comparator means (102) for generating a second control signal (DOWN) to the counter means (100) which indicates whether the value of the first hold signal (H1) is higher than the value of the auxiliary signal augmented by the addition value (Sa+Δ).

5. Apparatus according to claim 1, characterized in that, the second hold means comprises second counter means (110) for generating the second hold signal (H2), third comparator means (112) for generating a third control signal (DOWN) to the counter means which indicates whether the value of the auxiliary signal (Sa) is lower than the value of the second hold signal (H2), and fourth comparator (111) means for generating a fourth control signal to the second counter means (110) which indicates whether the value of the second hold signal (H2) is lower than the value of the auxiliary signal diminished by the subtraction value (Sa−Δ).

6. Apparatus according to claim 1, characterized in that, the first hold means (8) have leaking means (87) for gradually reducing the value of the first hold signal (H1).

7. Apparatus according to claim 1, characterized in that, the second hold means (9) have leaking means (97) for gradually increasing the value of the second hold signal (H2).

8. Apparatus according to claim 1, characterized in that, the first and/or the second hold means are provided with presetting means (83) for initializing the hold means at a preset value (H10).

\* \* \* \* \*